(12) United States Patent
Kubota

(10) Patent No.: US 7,597,167 B2
(45) Date of Patent: Oct. 6, 2009

(54) SNOWMOBILE

(75) Inventor: Takahiko Kubota, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 396 days.

(21) Appl. No.: 11/345,734

(22) Filed: Feb. 2, 2006

(65) Prior Publication Data

US 2006/0175108 A1 Aug. 10, 2006

(30) Foreign Application Priority Data

Feb. 3, 2005 (JP) ............................. 2005-027463

(51) Int. Cl.
*B62M 27/02* (2006.01)
*B62D 55/12* (2006.01)

(52) U.S. Cl. ...................... 180/191; 305/199

(58) Field of Classification Search ............... 180/194, 180/190, 191, 182; 305/199, 152, 169
See application file for complete search history.

(56) References Cited

U.S. PATENT DOCUMENTS

| | | | | |
|---|---|---|---|---|
| 1,931,027 A * | 10/1933 | Lee | ........................... | 74/574.4 |
| 3,575,474 A * | 4/1971 | Russ, Sr. | ...................... | 305/165 |
| 4,080,008 A * | 3/1978 | Groff et al. | ................. | 305/199 |
| 5,388,481 A * | 2/1995 | Andra | ........................ | 74/574.4 |
| 5,503,043 A * | 4/1996 | Olbrich | ..................... | 74/574.4 |
| 6,106,421 A * | 8/2000 | Graber et al. | ................. | 474/94 |
| 6,109,382 A | 8/2000 | Kubota | | |
| 6,161,908 A | 12/2000 | Takayama et al. | | |
| 6,283,241 B1 | 9/2001 | Kubota | | |
| 6,976,742 B2 * | 12/2005 | Girard et al. | ................ | 305/199 |
| 7,032,983 B2 * | 4/2006 | Wu et al. | ..................... | 305/195 |
| 2003/0141125 A1 * | 7/2003 | Wahl | ......................... | 180/191 |

* cited by examiner

*Primary Examiner*—Tony H. Winner
(74) *Attorney, Agent, or Firm*—Knobbe, Martens, Olson & Bear, LLP

(57) ABSTRACT

A snowmobile includes a track belt and a drive sprocket that couple with each other to propel the snowmobile with reduced noise and wear. The track belt has a plurality of driven projections and a plurality of driven windows at regular intervals along the direction of movement of the track belt. The drive sprocket has a projection drive portion and for engaging the driven projections and a window drive portion for engaging edges of the driven windows. In some embodiments, the driven projection, the driven window, the projection drive portion, and the window drive portion can be positioned so that the time when the driven projection and the projection drive portion contact each other is different from the time when the edge of the driven window and the window drive portion contact each other. Additionally, in some embodiments a damper is placed between the drive sprocket and the drive shaft. In some embodiments, a damper is coupled with at least a portion of a peripheral surface of at least one of the drive sprocket, the projection drive portion, and the window drive portion.

17 Claims, 15 Drawing Sheets

SNOWMOBILE

CROSS-REFERENCE TO RELATED APPLICATIONS

This application claims priority under 35 U.S.C. § 119(a) to Japanese Patent Application Serial No. 2005-027463, filed Feb. 3, 2005, the entire contents of which is hereby incorporated by reference.

BACKGROUND OF THE INVENTION

1. Field of the Invention

This application relates to a power transmission for a vehicle capable of operating on a snow surface.

2. Description of the Related Art

Snowmobiles are used for transport across snow surfaces, such as snowfields in cold climates. In a conventional snowmobile, an "endless" track belt (referred to herein as a track belt) is wrapped around front and rear wheels provided under the snowmobile vehicle body. The snowmobile is propelled as the track belt moves about the wheels, which are rotated by rotation of a power transmission connected to a drive shaft driven by an engine. One variation of the conventional snowmobile has front wheels with a sprocket that includes drive projections that engage driven projections and recesses on the track belt. The recesses are sometimes referred to herein as "windows."

More particularly, this conventional snowmobile has a pair of rows of projections formed at constant intervals along the moving direction of the track belt that are formed on the left and right sides of the inside round surface of the track belt. Between the paired driven projections, driven windows extend through top and reverse surfaces of the track belt at constant intervals along the moving direction of the track belt. The conventional snowmobile includes left and right front wheels connected to the drive shaft that include a sprocket with projection drive portions and window drive portions. The projection drive portions are formed around the outer perimeter of the sprockets on lateral sides thereof and are configured to engage the driven projection on the track belt. The window drive portions are formed around the outer perimeter of the sprockets and are configured to engage the driven windows on the track belt.

In the conventional design, the snowmobile propelled forward when rotation of the drive shaft, which, when a transmission is engaged, causes driven projections and windows on the track belt to be engaged by the projection drive portion and window drive portions respectively. In some conventional belt designs, surfaces of the belt are clad with steel.

A problem with the conventional design, however, is that the impact between the drive and driven parts, e.g., between the window drive portions and the driven windows creates a lot of noise, particularly with the surface of impact of these components covered with steel. While removing the steel would reduce the impact noise, it also would decrease the durability or lifespan of the track belt.

SUMMARY OF THE INVENTION

An aspect of the present invention includes the recognition that one factor that increases the noise level of the conventional snowmobile is that the projection drive portion and the window drive portion are provided at the same position (e.g., angle) around the periphery of the sprocket. Accordingly, the engagement between the driven projection and the projection drive portion occurs synchronously with the engagement between the edge of the driven window and the window drive portion. Noise is produced when the steel-covered track belt portion between adjacent windows contacts the window drive portion. Also, the window drive portion tends to wears off more quickly than desirable due to the collision with the steel-covered track belt portion.

An aspect of the present invention is directed to alleviate the above problems. That is, one aspect of the present invention is to reduce the noise due to collision of the track belt portion between driven windows and the window drive portion. Another aspect of the present invention is to prevent the track belt portion from wearing off or to substantially reduce such wear, thereby extending the life of the track belt.

A snowmobile in accordance with one or more aspects of the present invention comprises an endless track belt driven by an engine. The track belt can be pressed against a ground surface (e.g., a the snow surface, an ice surface, grass, or water) by a slide rail. Movement of the track belt can be caused by the rotation of a drive shaft driven to rotate by an engine. In one form, an inside circumferential surface of the track belt is formed with a drive track portion having a plurality of driven projections. The driven projections can be located at substantially constant intervals along the moving direction of the track belt. A depression track portion that has a plurality of driven windows that can be located at a substantially constant interval along the moving direction of the track belt is provided. The slide rails can be arranged parallel to each other to press the track belt against the snow surface. A projection drive sprocket that has a projection drive portion for engaging the driven projection is coupled with the drive shaft. A window drive sprocket that has a window drive portion for engaging an edge of a driven window is coupled with the drive shaft. The driven projection, the driven window, the projection drive portion, and the window drive portion are positioned so that the time when the driven projection and the projection drive portion contact each other is different from the time when the edge of the driven window and the window drive portion contact each other.

In one aspect, as the snowmobile runs forward the time of contact between the driven projection and the projection drive portion can be set to be in advance of the time of contact between the edge of the driven window and the window drive portion. In one aspect, the driven projection can comprise a rubber material and a surface of a portion of the track belt between adjacent windows can be covered with a wear resistant cover member, e.g., a cover member made of a hard metal.

In one arrangement, the driven windows extend from a top surface to a reverse surface of the track belt, e.g., all the way through the track belt. The track belt portion located between the driven windows, sometimes referred to herein as a "web portion" tends to wears or breaks more easily or quickly than the driven projections of the track belt. In one aspect, the time when the driven projection contacts the projection drive portion is different from the time when the edge of the driven window contacts the window drive portion. Accordingly, the forces or shocks applied to the track belt are dispersed, reducing the likelihood that the track belt will break. Also, timing the engagement of an edge of web portion with the window drive portion after the engagement of the driven projection with the projection drive portion reduces the force of impact between the web portion and the window drive portion and therefore prevents, reduce, or minimizes wear and/or breakage of the track belt, e.g., of the web portions. Moreover, even where a surface of the web portion includes a wear resistant cover member, impact between the cover member and the window drive portion decreases, so that less noise is produced.

In another aspect, when a wear resistant cover is provided on the surface of the driven projection, e.g., in a constitution in which the driven projection is likely to wear out more quickly than the web portion, the time when the edge of the driven window contacts the window drive portion is set to be before the time when the driven projection contact the projection drive portion. In this way, the wear of the driven projection is reduced or prevented and the amount of noise generated is lessened. As described above, it is possible to reduce or prevent wear or breakage of the web portion and the driven projection and to reduce the level of noise by modifying the layout of the driven projection, the driven window, the projection drive portion, and the window drive portion. For example, an arrangement can be provided in which the time when the driven projection contacts the projection drive portion is different from the time when the edge of the driven window contacts the window drive portion.

In another aspect, a snowmobile can be arranged such that the drive sprocket is coupled with the drive shaft through a hub. A hub damper can be provided around and along at least a portion of the shaft within the hub. An inside circumferential part and an outside circumferential part of the hub can be interconnected through the hub damper. This arrangement reduces the impact produced by the engagement between the driven projection and the projection drive portion and the impact produced by the engagement between the edge of the driven window and the window drive portion. Because the force and shocks of such impacts are at least partially absorbed by the hub damper, the drive sprocket and the track belt are exposed to lower shocks and forces and are less likely to break or produce noise. In another aspect, where the projection drive sprocket and the window drive sprocket are made as separate members,-at least one of them is provided with or coupled with the hub damper.

In another aspect, at least one of a peripheral surface of the drive sprocket, a surface of the projection drive portion for contacting the driven projection, or a surface of the window drive portion for contacting the edge part of the driven window can be provided with a periphery damper. The periphery damper(s) are configured to absorb impacts or shocks, which can be produced in any part on the contact surface between the drive sprocket and the track belt, e.g., on the contact surface between the driven projection and the projection drive portion, on the contact surface between the edge of the driven window and the window drive portion, etc. The periphery damper(s) are thus configured to reduce the likelihood of the drive sprocket and the track belt breaking or producing excessive noise.

In another aspect, a vehicle configured to run on a snow surface by driving an endless track belt, e.g., a snowmobile, is provided. The track belt is pressed by a slide rail against the snow surface and the vehicle is rotated by the rotation of a drive shaft, which is driven by the drive of an engine. The circumferential surface of the track belt can be formed with a drive track portion having a plurality of driven projections at regular, e.g., substantially constant, intervals along the moving direction of the track belt. The track belt also can include a depression track portion having a plurality of driven windows at regular, e.g., substantially constant, intervals along the moving direction of the track belt. The driven windows can be depressed against the snow when the slide rail press against the track belt. The slide rails can be parallel to each other. A drive sprocket comprising a projection drive sprocket having a projection drive portion for engaging with the driven projections and a window drive sprocket having a window drive portion for engaging with the edge of the driven windows can be coupled with the drive shaft through a hub. In one embodiment, a hub damper is provided at least partially around and along the shaft, e.g., within the hub. The inside circumferential part and the outside circumferential part of the hub can be interconnected through the hub damper.

In the above arrangements, impacts caused by the contact between the driven projection and the projection drive portion and by the contact between the edge of the driven window and the window drive portion are absorbed with the hub damper, reducing or eliminating noise. Also, the drive sprocket and the track belt are less likely to break and generally last longer because wear of these components is reduced, even in arrangements where the driven projection and the driven window are simultaneously contacted by the projection drive portion and the window drive portion.

In another aspect, a snowmobile is provided in which an endless track belt drives the snowmobile in the state of being pressed with a slide rail against the snow surface. Rotation of a drive shaft driven to rotate by the drive of an engine rotates the track belt. The inside circumferential surface of the track belt is formed with a drive track portion having a plurality of driven projections at regular, e.g., substantially constant, intervals and a depression track portion having a plurality of driven windows at regular, e.g., substantially constant, intervals along the moving direction of the track belt. The track belt is depressed by the slide rail against the snow surface. The rails can be parallel to each other. A drive sprocket comprises a projection drive sprocket having a projection drive portion for engaging the driven projection and a window drive sprocket having a window drive portion for engaging with the edge of the driven window. The drive sprocket is fixed to the drive shaft. At least one of the peripheral surface of the drive sprocket, a surface of the projection drive portion for contacting a driven projection, and a surface of the window drive portion for contacting an edge of the driven window are provided with a periphery damper.

In the above aspect, excess noise levels and premature breakage of the drive sprocket and track belt are reduced, minimized, or prevented because impacts occurring at any portion of a contact surface between the drive sprocket and the track belt, e.g., the contact surface between the driven projection and the projection drive portion, and the contact surface between the edge of the driven window and the window drive portion, are absorbed by the outside periphery damper.

Another aspect provides a snowmobile with a drive sprocket that comprises an assembly of a projection drive sprocket and a window drive sprocket. The projection drive sprocket and a window drive sprocket are made as separate members. In this way, forming of the projection drive sprocket and a window drive sprocket is simplified.

Another aspect provides a snowmobile with a drive sprocket that is formed as a single member by integral forming. In this way, since the projection drive portion and the window drive portion of the drive sprocket may be placed accurately in specified positions, design accuracy of the drive sprocket may be improved.

In another aspect, a track belt is driven by the drive of an engine to drive a snowmobile on a snow surface. On the inside circumferential surface of the track belt are formed parallel to each other a first track having a plurality of driven projections that can be regularly or evenly spaced along the moving direction and a second track 32 having a plurality of windows that can be regularly or evenly spaced along the moving direction. A sprocket is fixed to a drive shaft, with the sprocket made up of a projection drive sprocket having drive projections for engaging with the driven projections and a window drive sprocket having window drive projections for engaging with a track belt portion located between successive windows along the second track. The time of contact between the driven projection and the drive projection is different from, e.g., in advance of or after, the time of contact between the track belt portion between successive windows and the window drive projection.

In one aspect, a snowmobile comprising an engine configured to rotate a drive shaft, a track belt, and a slide rail. The track belt has an inner surface. The track belt has a first track portion with a plurality of driven projections at regular intervals along the direction of movement of the track belt, and a second track portion. The second track portion has a plurality of driven windows at regular intervals along the direction of movement of the track belt. The slide rail is configured to apply pressure to the inner surface of the track belt to press the track belt against a riding surface. The snowmobile also has a drive mechanism that has a first drive sprocket portion and a second drive sprocket portion. The first drive sprocket portion has one or more members for engaging the driven projections. The first drive sprocket portion is coupled with the drive shaft. The second drive sprocket portion has a window drive portion for engaging an edge of the driven windows. The second drive sprocket portion is coupled with the drive shaft. The driven projection, the driven window, the projection drive portion, and the window drive portion are positioned so that the time when the driven projection and the projection drive portion initially engage each other is different from the time when the edge of the driven window and the window drive portion initially engage each other.

In another aspect, a snowmobile is provided that includes an engine configured to rotate a drive shaft and a hub coupled with the drive shaft. The snowmobile also includes a track belt configured to be driven upon rotation of the drive shaft and a slide rail. The track belt has an inner surface that comprises a first track portion and a second track portion. The first track portion has a plurality of driven projections at substantially constant intervals along the direction of movement of the track belt. The second track portion has a plurality of driven windows at substantially constant intervals along the direction of movement of the track belt. The slide rail is configured to be positioned over the second track to press the track belt into a ground surface. The snowmobile also includes a drive device and a hub damper. The drive member includes a projection drive sprocket that has a projection drive portion configured to engage the driven projection and a window drive sprocket that has a window drive portion configured to engage an edge of the driven window. The drive member is coupled with the drive shaft through a hub. The hub damper is disposed around the drive shaft and is located between an inner circumferential portion of the hub and an outer circumferential portion of the hub.

In another aspect, a snowmobile is provided that includes an engine configured to rotate a drive shaft, a track belt, and a slide rail. The track belt is configured to be driven upon rotation of the drive shaft. The track belt has an inner surface that has a drive track portion and a depression track portion. The drive track portion has a plurality of driven projections at substantially constant intervals along the direction of movement of the track belt. The depression track portion has a plurality of driven windows at substantially constant intervals along the direction of movement of the track belt. The drive track portion and the depression track portion are substantially parallel to each other. The slide rail is configured to be positioned in the depression track portion and to press the track belt into a ground surface. The snowmobile also includes a drive sprocket coupled with the drive shaft. The drive sprocket comprises a projection drive sprocket, a window drive sprocket, and a periphery damper. The projection drive sprocket has a projection drive portion for engaging the driven projection. The window drive sprocket has a window drive portion for engaging the edge of the driven windows. The periphery damper is coupled with at least a portion a peripheral surface of at least one of the drive sprocket, the projection drive portion, and the window drive portion.

In another aspect, a track belt for use with a snowmobile includes an outer surface for engaging a ground surface and an inner surface opposite the outer surface. The inner surface has a first track portion with a plurality of driven projections at regular intervals along the direction of movement of the track belt and a second track portion laterally off-set from the first track portion. The second track portion has a plurality of driven windows at regular intervals along the direction of movement of the track belt. Each of the driven projection is off-set in the direction of movement of the track belt from an adjacent driven window by less the interval between successive driven projections.

BRIEF DESCRIPTION OF THE DRAWINGS

These and other features, aspects and advantages of the present invention will now be described in connection with preferred embodiments of the invention in reference to the accompanying drawings. The illustrated embodiments, however, are merely examples and are not intended to limit the invention. The following are brief descriptions of the drawings.

DETAILED DESCRIPTION OF THE PREFERRED EMBODIMENT

Embodiments of the present invention will be hereinafter described in connection with the attached drawings.

Figure 1:
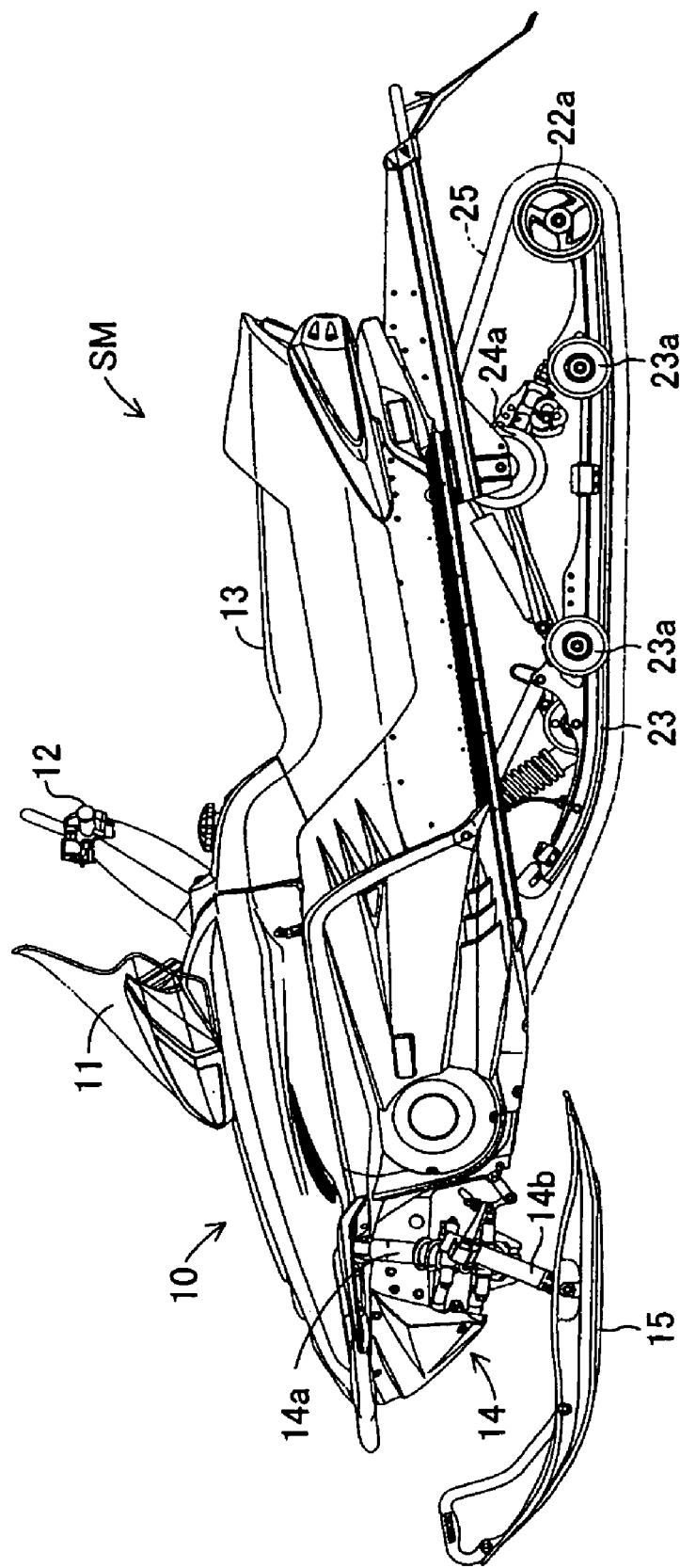
FIG. 1 is a side view of one embodiment of a snowmobile.
Figure 2:
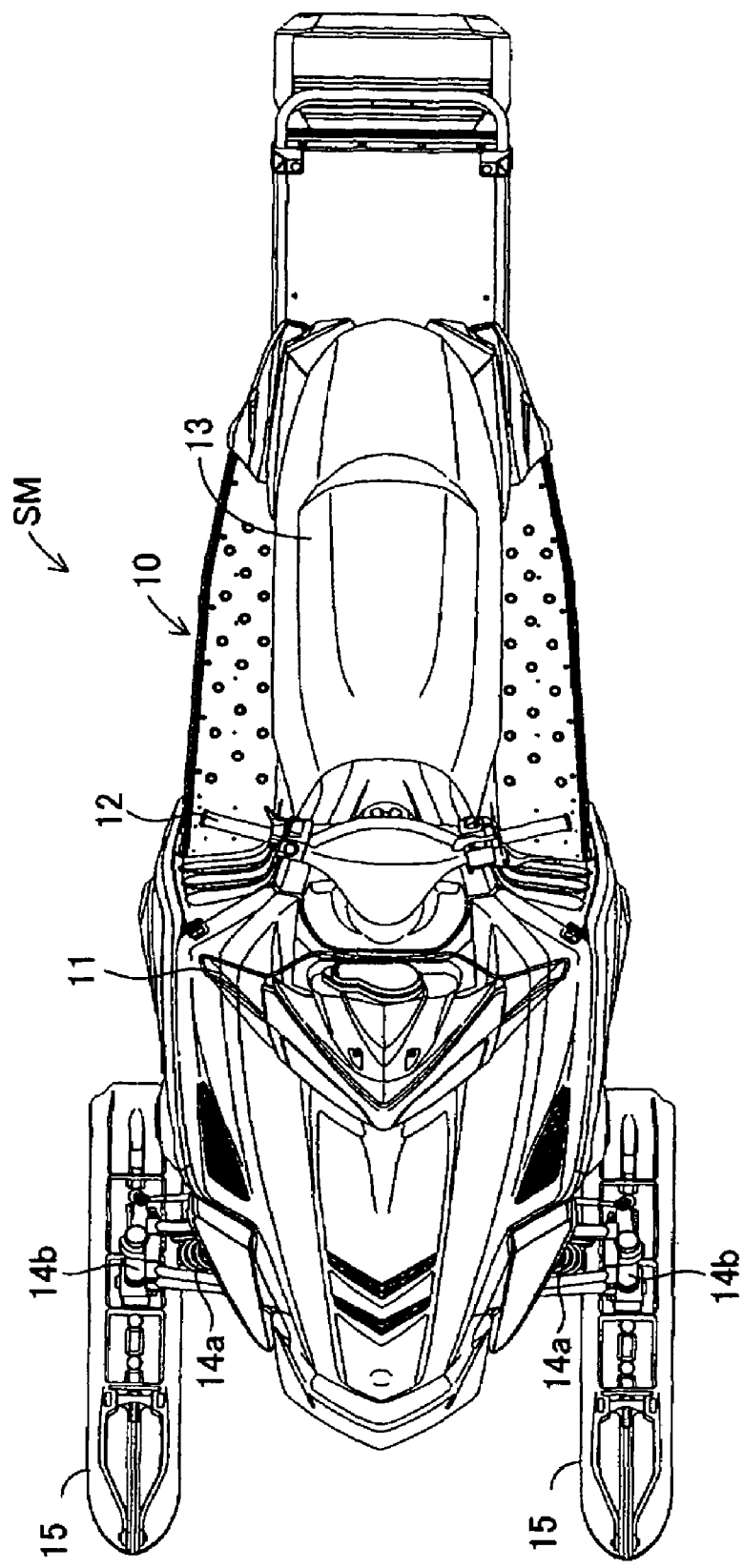
FIG. 2 is a plan view of the snowmobile shown in FIG. 1.

FIGS. 1 and 2 show a snowmobile SM according to one embodiment. On the upper front side of a vehicle body 10 constituting the main part of the snowmobile SM, a windshield 11 is provided. Handlebars 12 for steering the snowmobile SM are provided behind the windshield 11. The upper rear part of the vehicle body 10 is formed as a seat 13 for a driver to sit on.

A front suspension 14 is provided inside a front-end side of the vehicle body 10 and is connected to the handlebars 12. The front suspension 14 is provided with connecting rods 14b respectively extending below the vehicle body 10 through dampers 14a. The rods 14b and dampers 14a are provided on both left and right sides of the vehicle body 10. Steering skis 15 are connected to the lower ends of the connecting rods 14b.

Figure 3:
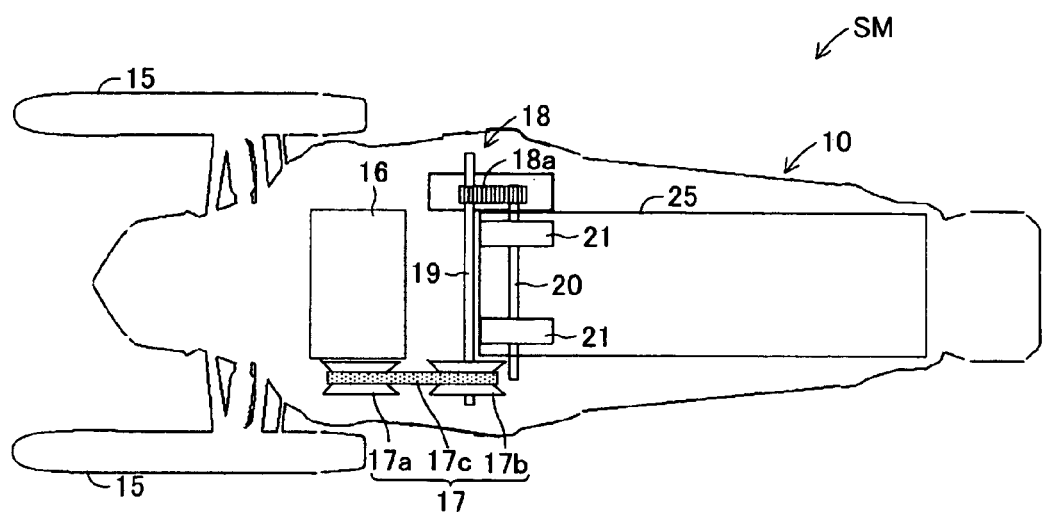
FIG. 3 is an overview of the internal constitution of a drive portion of the snowmobile shown in FIG. 2.

As shown in FIG. 3, an engine 16 is placed inside front part of the vehicle body 10. In one arrangement, a primary transmission 17 and a secondary transmission 18 are placed behind the engine 16 in succession in the fore-and-aft direction. The primary transmission 17 comprises in one embodiment a primary sheave 17a connected to a crankshaft (not shown) of the engine 16 to rotate as the crankshaft rotates, a secondary sheave 17b, and a V-belt 17c entrained around the primary sheave 17a and the secondary sheave 17b to transmit the rotary force of the primary sheave 17a to the secondary sheave 17b.

The secondary sheave 17b can be attached to one end of a secondary shaft 19 placed behind and parallel to the crankshaft. Therefore, rotary force can be transmitted from the crankshaft to the secondary shaft 19 as the crankshaft rotates by the drive of the engine 16. The primary sheave 17a and the secondary sheave 17b can comprise respectively two circular members so that the interval between the two members may be changed as one moves back and forth relative to the other. Therefore, it is constituted that positions of engagement of the V-belt 17c with the primary sheave 17a and the secondary sheave 17b change according to the change in the intervals between the two members of the primary sheave 17a and between the two members of the secondary sheave 17b, so that the transmission ratio is changed steplessly according to the position of the V-belt 17c.

The secondary transmission 18 can include a cog part (not shown) provided on an end of the secondary shaft 19, a cog part (not shown) provided on an end, opposite the cog part of the secondary shaft 19, of a drive shaft 20 placed behind and parallel to the secondary shaft 19. A sprocket chain 18a entrained around both of the cog parts is also provided in the secondary transmission 18. With the sprocket chain 18a, the rotary force of the secondary shaft 19, with its rotary speed changed, is transmitted to the drive shaft 20.

Figure 4:
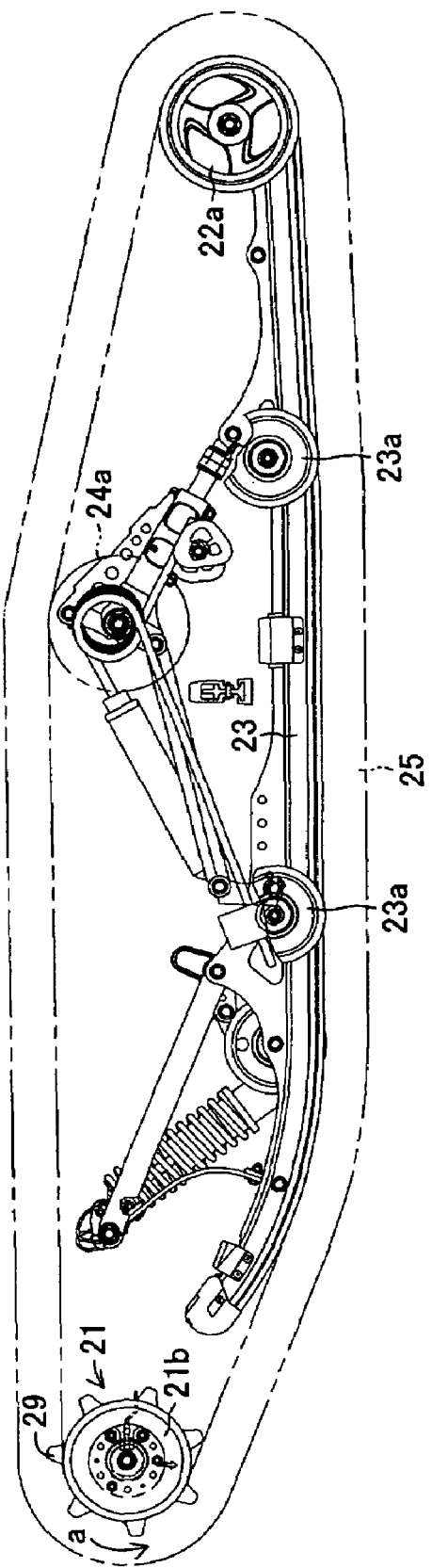
FIG. 4 is an overview of one arrangement of a track belt and sprocket assembly of the snowmobile shown in FIG. 1.
Figure 5:
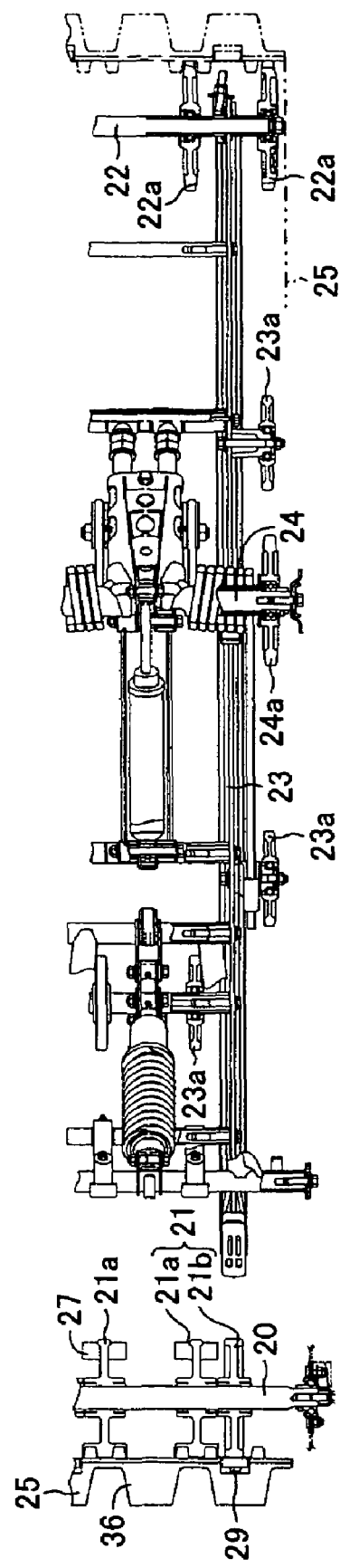
FIG. 5 is top view of some of the components illustrated in FIG. 4.

A sprocket 21 configured according to various embodiments described herein is respectively provided on each side parts of the drive shaft 20. A free motion shaft 22 is placed, as shown in FIGS. 4 and 5, parallel to the drive shaft 20 in the rear part of the vehicle body 10, with a pair of free wheels 22a provided on both side parts of the free shaft 22. A slide rail 23 and a plurality of guide wheels 23a are provided in the lower area between the sprocket 21 and the free wheel 22a. A shaft part 24 is provided in the upper area between the sprocket 21 and the free wheel 22a. Guide wheels 24a are provided on both sides of the shaft part 24. An endless track belt 25 is routed around the sprocket 21, the free wheel 22a, the slide rail 23, and the guide wheels 23a, 24a. An inner surface of the track belt 25 (e.g., a surface opposite a snow contacting surface of the track belt) can be in contact with one or more of the sprocket 21, the free wheel 22a, the slide rail 23, and the guide wheels 23a, 24a.

Figure 6:
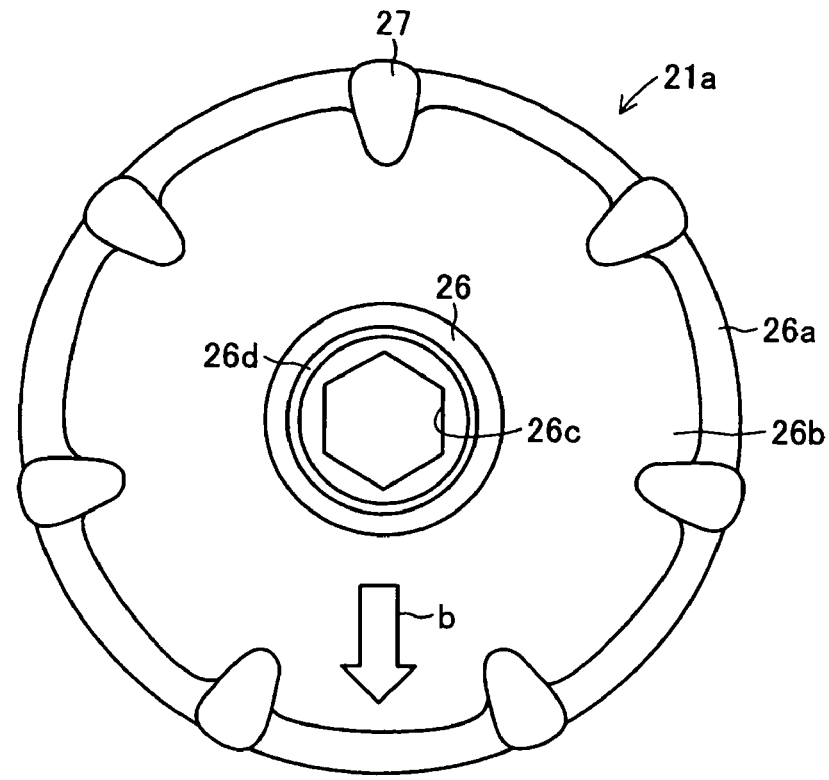
FIG. 6 is a front view of one embodiment of a projection drive sprocket.
Figure 7:
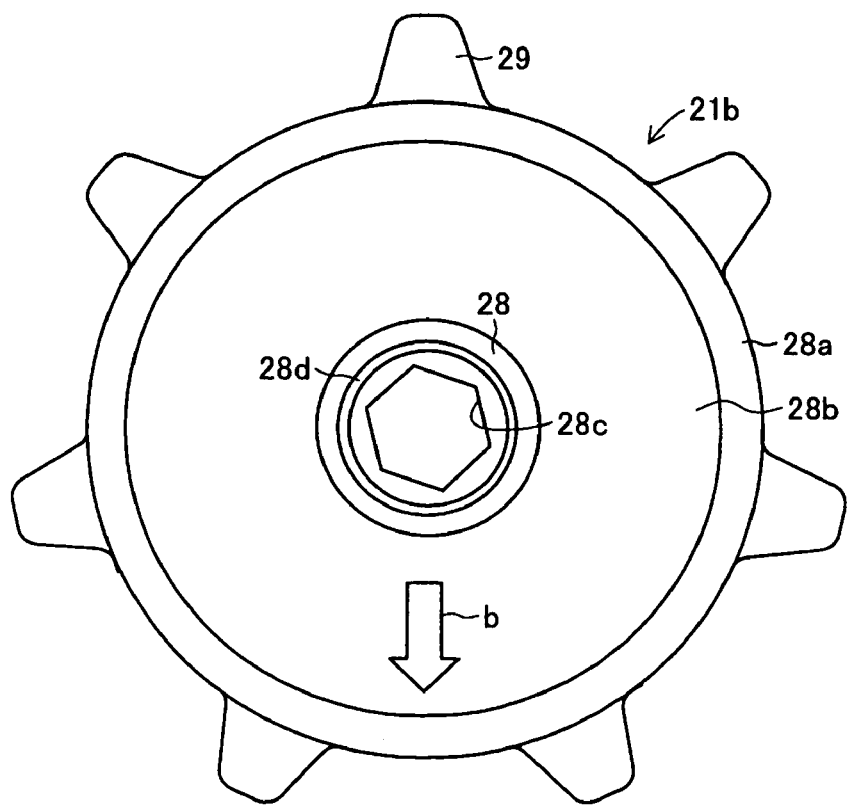
FIG. 7 is a front view of one embodiment of a window drive sprocket.
Figure 8:
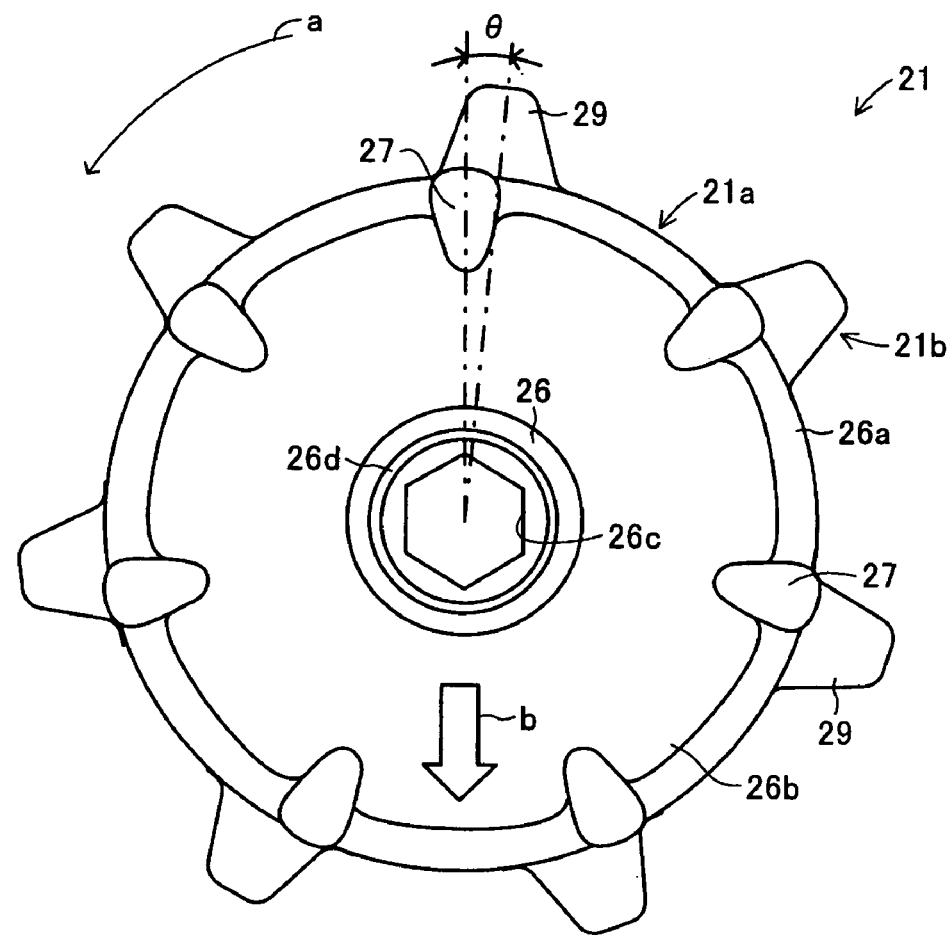
FIG. 8 is a front view of one embodiment of a sprocket made by combining one embodiment of a projection drive sprocket and one embodiment of a window drive sprocket.

The sprocket 21 comprises a projection drive sprocket 21a shown in FIG. 6 and a window drive sprocket 21b shown in FIG. 7 in a manner as shown in FIG. 8. As discussed further below, the sprocket 21 can be a member that can be integrally formed, e.g., with a unitary construction by a process such as injection molding, in some embodiments. In other embodiments, the sprocket 21 can be a member that can be formed with separate components, e.g., the projection drive sprocket 21a and the window drive sprocket 21b, that can be separately mounted on the drive shaft. The projection drive sprocket 21a comprises a hub 26 of a substantially cylindrical shape comprising a central part or portion, a circumferential surface part or portion 26a, e.g., having a ring shape. The circumferential portion 26a can comprise a peripheral portion. The projection drive sprocket 21a also can comprise a web portion 26b interconnecting the hub 26 and the circumferential portion 26a. In one arrangement, the web portion 26b has a thin plate shape. A hexagonal hole 26c (or hole of another shape, e.g., any other polygon) can be provided, e.g., by being bored, in the center of the hub 26. A reinforcing member 26d, which can be a metallic support, can be attached to or coupled with the parts around the hole 26c on both sides in the axial direction of the hub 26 (see FIG. 10). A plurality of drive projections 27 of a suitable number, e.g., seven in one embodiment, can be provided at regular, e.g., substantially constant, intervals on both side faces of the circumferential portion 26a.

The projection drive sprocket 21a and the window drive sprocket 21b can be coupled with the drive shaft 20 as shown in FIG. 8 so that a central portion of the drive projection 29 rotates as delayed by an angle of $\theta$ from a central portion of the drive projection 27 with respect to the rotary direction (a). The drive shaft 20 can be formed also in a shape that matches the shape of the holes 26c, 28c, e.g., in a hexagonal or other polygon shape in cross section. As the drive shaft 20 is press-fit into both the hole 26c of the projection drive sprocket 21a and the hole 28c of the window drive sprocket 21b, the projection drive sprocket 21a and the window drive sprocket 21b are fixed to the drive shaft 20 to be immovable in both directions about the shaft and along the shaft. Any other suitable technique for interconnecting a sprocket and a shaft can also be used.

The window drive sprocket 21b can comprise a hub 28 of a substantially cylindrical shape having a central portion, a circumferential surface part 28a comprising a peripheral part, and a web portion 28b. The web portion 28b can be comprised as a thin plate shape interconnecting the hub 28 and the circumferential surface part or portion 28a. The circumferential surface part or portion 28a can comprise a ring shape portion. A hexagonal hole 28c (or one of another suitable shape, e.g., any polygon) can be formed, e.g., bored, in the center of the hub 28. In one embodiment, a reinforcing member 28d, which can comprise a metallic support, can be coupled, e.g., attached to the parts around the hole 28c on both sides in the axial direction of the hub 28. A plurality of drive projections 29, e.g., seven in one embodiment, can be provided as window drive portions. The drive projections 29 can be formed at regular, e.g., substantially constant, intervals on the circumferential surface of the circumferential portion 28a. The projection drive sprocket 21a and window drive sprocket 21b can be made in substantially the same shape except for the drive projections 27 and 29. The projection drive sprocket 21a and the window drive sprocket 21b can be made of any suitable material, e.g., of a wear resistant metal or polymer, e.g., super high polyethylene polymer.

Figure 9:
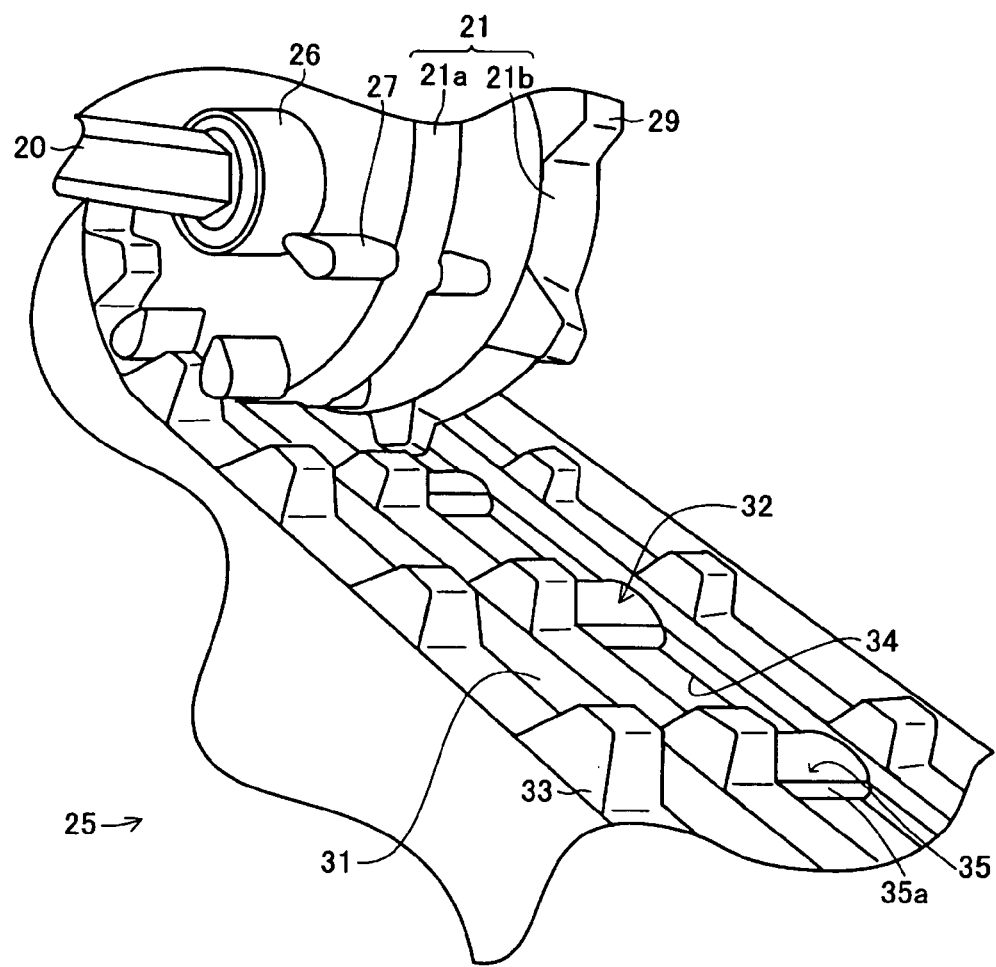
FIG. 9 is an oblique view of a portion of the snowmobile of FIG. 1 showing the engagement of one embodiment of a sprocket and one embodiment of a-track belt.
Figure 10:
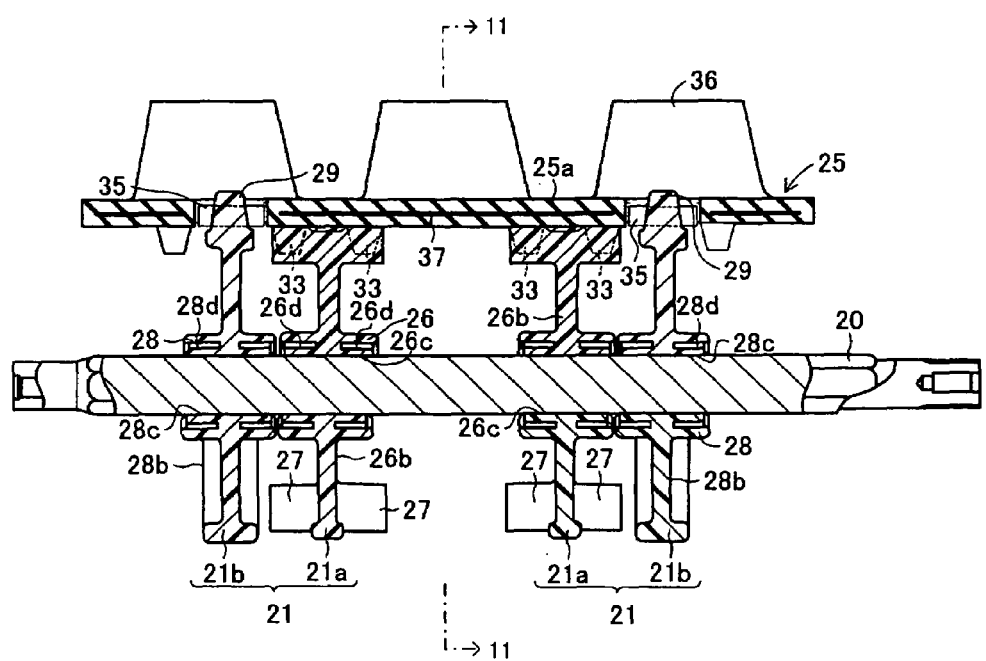
FIG. 10 is a sectional view illustrating engagement of one embodiment of a sprocket and a track belt.
Figure 11:
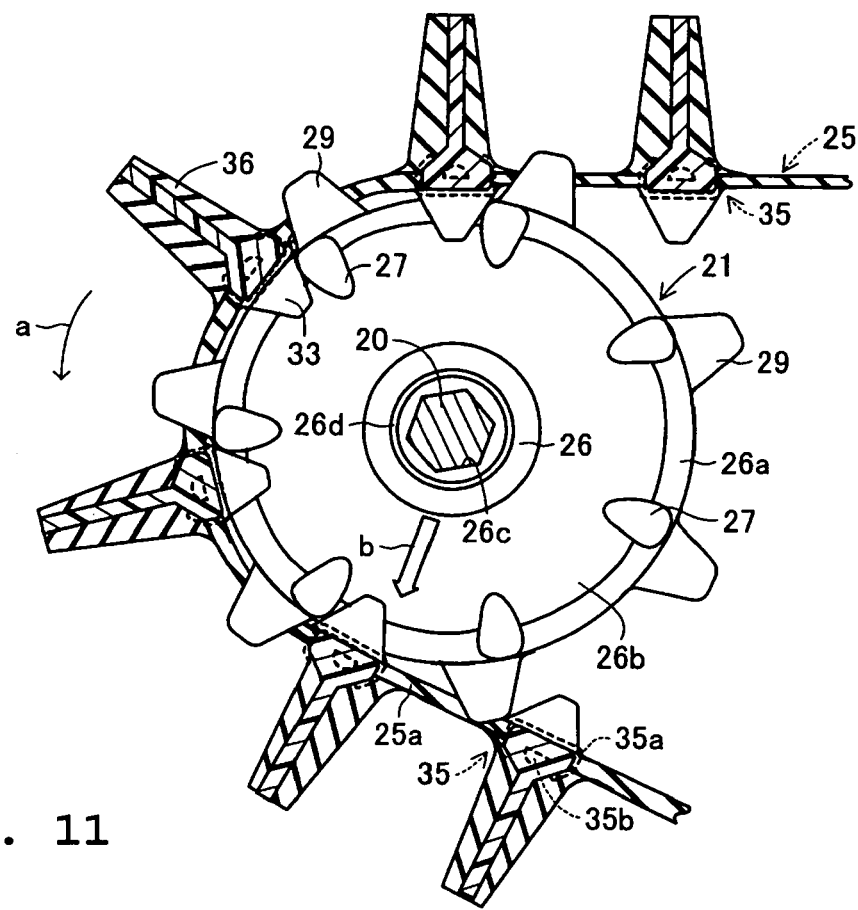
FIG. 11 shows a sectional view, taken along the section line 11-11 of FIG. 10.

FIGS. 9-11 illustrate additional feature of the track belt 25. In one embodiment, on at least one, e.g., both, sides of the inside circumferential surface of the track belt 25 are formed a first track 3-1 and a second track 32. The first track portion 31 is configured as a drive track portion and is configured to be contacted by the circumferential surface part 26a of the projection drive sprocket 21a. The second track 32 is configured as a depression track portion and is configured to be contacted by the circumferential surface part 28a of the window drive sprocket 21b. The second track 32, when it comes to a position below the circulating track belt 25, is depressed or pressed toward the snow by the slide rail 23. A plurality of, e.g., two, rows of driven projections 33 can be formed on both side parts along the longitudinal direction of the first track 31. The driven projections 33 can be formed at regular, e.g., substantially constant intervals. The intervals can be slightly longer than the thickness of the circumferential surface part 26a or can be about equal to the intervals of the drive projections 27 in the circumferential direction of the sprocket 21a. In one embodiment, the lateral separation of the two rows of driven projections 33 can be about equal to or slightly greater than the thickness of the circumferential surface part 26a.

FIG. 8 illustrates this manner of arranging the projection drive sprocket 21a and the window drive sprocket 21b for mounting on the shaft 20. The paired sprockets 21 are both attached to the drive shaft 20 such that the projection drive sprocket 21a is located on an inner side and the window drive sprocket 21b. An arrow b indicates the down direction. When the projection drive sprocket 21a and window drive sprocket 21b are combined together, the down direction b as shown in FIGS. 6 and 8 is indicated relative to the projection drive sprocket 21a.

The second track 32 has, along its longitudinal direction, a plurality of driven windows 34 formed in, e.g., bored through, the top and reverse surfaces of the track belt 25. The driven windows 34 can be formed at regular, e.g., substantially constant intervals. The intervals can be about equal to the intervals of the drive projections 29 in the circumferential direction of the sprocket 21b. A web portion 35 of the track belt 25 is located between adjacent driven windows 34. The web portion 35 comprises an edge that can be engaged by the window drive portions 29. In one embodiment, a surface part of the web portion 35 comprises a cover member 35a that is configured to resist wear. For example, the cover member can comprise a plate of hard material, such as steel. The inside of the web portion 35 can comprise a reinforcing member 35b that can be configured as a rod. The reinforcing member can be formed of any suitable material, such as of plastic containing glass fibers. In one embodiment, the web portion 35 and the driven projection 33 are provided approximately at the same position in the circumferential (circulating) direction of the track belt 25.

A plurality of projections 36, e.g., three projections, is formed in positions corresponding to the driven projection 33 and the track belt portion 35 on the outside circumferential surface of the track belt 25 at intervals in the width direction of the track belt 25. The interval spacing the projections 36 can be regular, e.g., constant, or irregular. The track belt 25 is made of a suitable material, e.g., one that will not wear out in a short period and that can be easily manufactured. On such suitable material is a rubber material. FIG. 10 shows a core member 37 that can be made of plastic and fiberglass that can be provided inside the base part 25a of the track belt 25. The track belt 25 is caused to circulate by the drive of the engine 16. The track belt 25 circulates, while causing each projection 36 of its underside to engage with the snow surface, to propel the snowmobile SM forward.

The operation of the snowmobile SM over the snow will now be described. The snowmobile SM can be made to run by driving the engine by turning on a switch (not shown) provided in the vicinity of the handlebar 12, and operating the throttle lever (provided on the handlebar 12) and the handlebars 12. As the crankshaft of the engine 16 rotates and its rotary force is transmitted to the drive shaft 20 through the primary transmission 17 and the secondary transmission 18, the drive shaft 20 rotates counterclockwise (rotary direction (a)) in FIG. 4.

Figure 12:
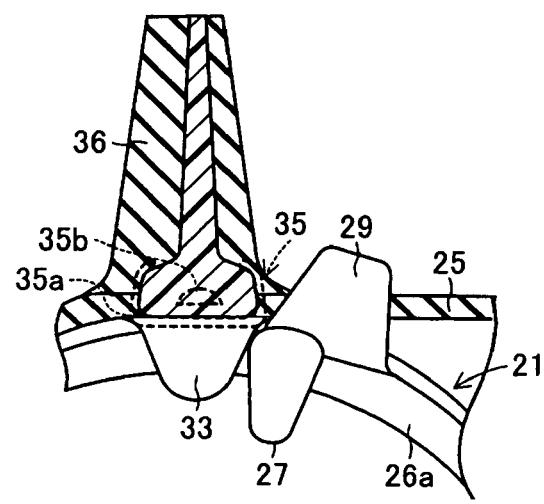
FIG. 12 is an enlarged sectional view of a portion of FIG. 11.

This causes the track belt 20 to circulate along with the rotation of the drive shaft 20. The rotational position of the center of the drive projection 29 is delayed from the rotational position of the center of the drive projection 27 by an angle of θ, as shown in FIG. 12. Therefore, at the time the drive projection 27 contacts the driven projection 33, the drive projection 29 is yet to contact the web portion 35. That is, after the drive projection 27 engages with the driven projection 33 and the rotary drive force of the sprocket 21 is transmitted to the track belt 25 at least to some extent, the drive projection 29 engages with the web portion 35 to transmit greater rotary drive force from the sprocket 21 to the track belt 25.

Therefore, effective impact force when the drive projection 29 contacts the track belt portion 35 decreases, and noise is not produced even if the drive projection 29 of a great hardness, e.g., one made of super high polyethylene polymer, collides with the web portion 35 made of the cover member 35a with its surface made of steel sheet. In one embodiment, the driven projection is made of rubber and deflects to prevent the drive projection 27 from disengaging from the driven projection 33. In one embodiment, the drive projection 29 engages with the track belt portion 35 and the drive projection 27 engages with the driven projection 33. Rotary force of the rotary shaft 20 is thereby transmitted to the track belt 25 so that the snowmobile SM runs in the steered direction at speeds selected by the driver.

With the snowmobile SM as described above, since the drive projection 29 engages with the track belt portion 35 after the drive projection 27 engages with the driven projection 33, the impact forces of the drive projection 29 and the track belt portion 35 are decreased to prevent the web portion 35 and the drive projection 29 from wearing off and/or breaking. Also noise is reduced and excess noise can be prevented from being produced by the impacts at that time. Because the sprocket 21 is made up of separate members, the projection drive sprocket 21a and the window drive sprocket 21b, making the sprocket 21 is facilitated. Also, the sprocket 21 does not displace in the direction about the axis of the drive shaft 20 because the drive shaft 20 and the holes 26c, 28c are made in hexagonal shape in cross section (or other polygonal or other suitable shape). As a result, circulating motion of the track belt 25 is smooth.

Figure 13:
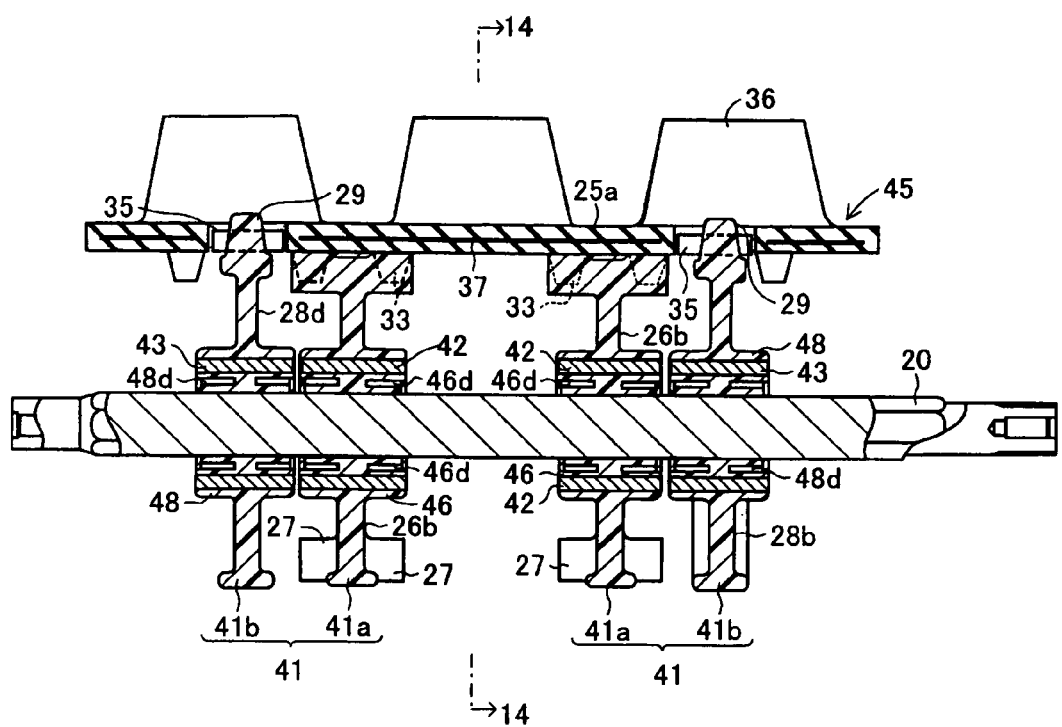
FIG. 13 is a sectional view illustrating engagement of another embodiment of a sprocket and a track belt.
Figure 14:
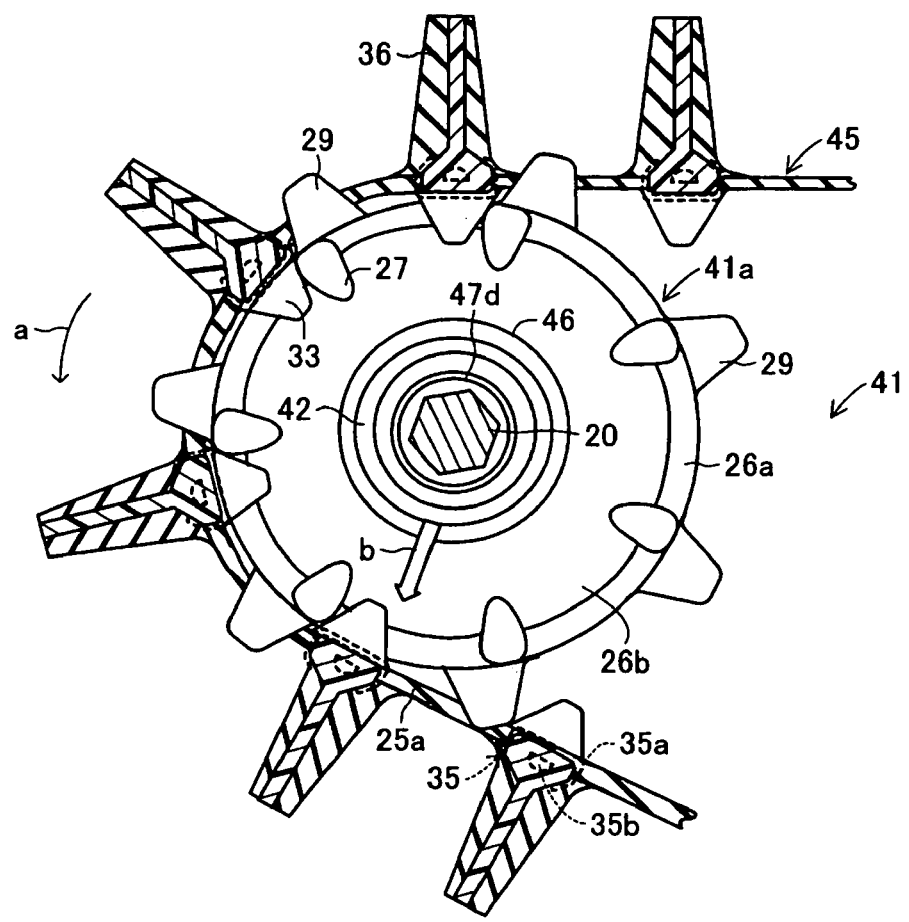
FIG. 14 shows a sectional view, taken along the section line 14-14 of FIG. 13.

FIGS. 13 and 14 show another embodiment of a snowmobile in which a track belt 45 is coupled with a sprocket 41. The sprocket 41 comprises a projection drive sprocket 41a and a window drive sprocket 41b that are combined. A support member 46d, which can be made of metal, for reinforcement similar to the support member 26d is coupled within a hub 46, or the central part of a projection drive sprocket 41a. A cylindrical damper 42 can be provided at a distance from the support member 46d, spaced toward the periphery of the sprocket 41.

A support member 48d, which can be made of metal, for reinforcement similar to the metallic support member 28d can be provided within the hub 48, or the central part of a window drive sprocket 41b. A cylindrical damper 43 can be provided at a distance from the support member 48d, e.g., spaced toward the periphery of the sprocket 41. The dampers 42 and 43 can be formed with a suitable shock or vibration absorbing material and/or construction, e.g., can be made of rubber material, and can be fixed to respectively corresponding parts of the hubs 46 and 48. The hubs 46, 48 can be made of a wear resistant material, and can be made of a suitable polymeric material, such as super high polyethylene polymer. The hubs 46, 48 can be made by integral molding. The dampers 42 and 43 are sometimes referred to herein as hub dampers. Other part of the sprocket 41, the track belt, and other components of the track belt drive arrangement in various embodiments can be the same as that of the sprocket 21 and the track belt 25 as described above. Therefore, the same parts are provided with the same reference numerals and symbols, and the discussion of these components set forth above is hereby incorporated here. Further, the arrangement of the snowmobile with which the sprocket 41 can be coupled can be the same as that of the snowmobile SM described above.

In this embodiment, the impacts produced by the engagement between the drive projection 27 and the driven projection 33 can be substantially absorbed by the damper 42, so that the drive projection 27 of the projection drive sprocket 41a and the driven projection 33 of the track belt 45 are less likely to break or wear off. Further, since impacts produced by the engagement between the drive projection 29 and web portion 35 are absorbed with the damper 43, the window drive sprocket 41b and the web portion 35 of the track belt 45 are less likely to break prematurely or produce excessive noise. The damper 43 can reduce the noise produced by this impact. Other functional effects of the snowmobile provided with this sprocket 41 are the same as those of the snowmobile SM described before.

Figure 15:
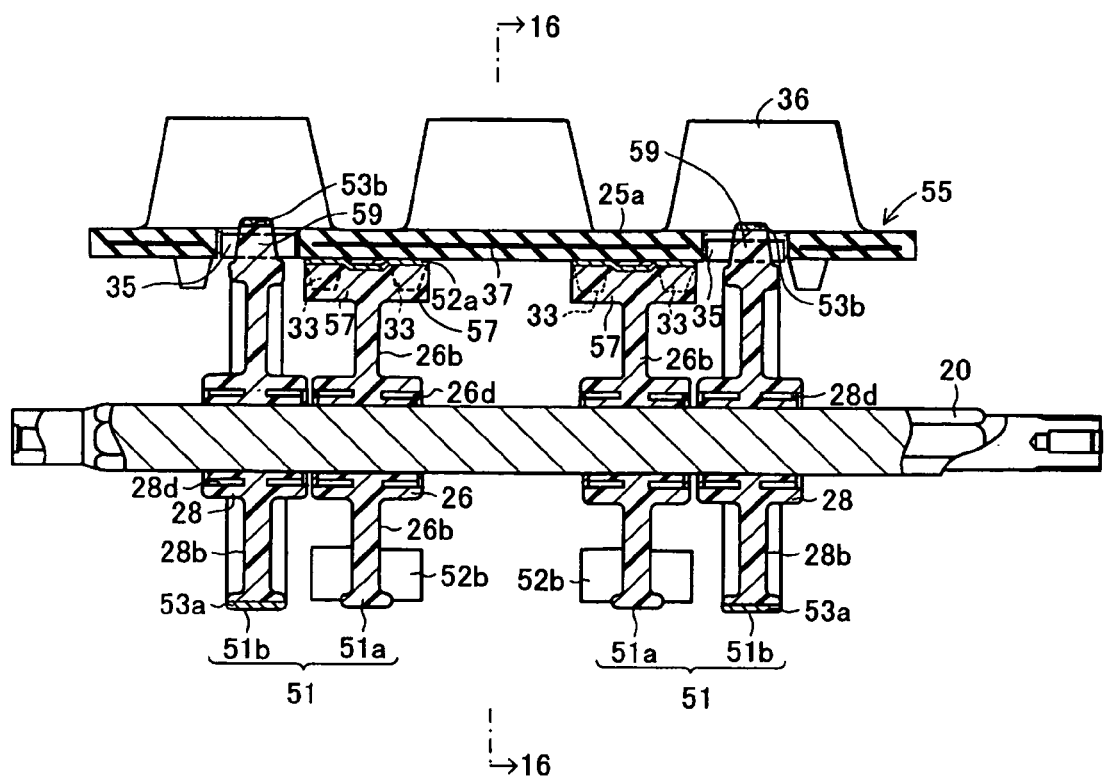
FIG. 15 is a sectional view illustrating engagement of another embodiment of a sprocket and a track belt.
Figure 16:
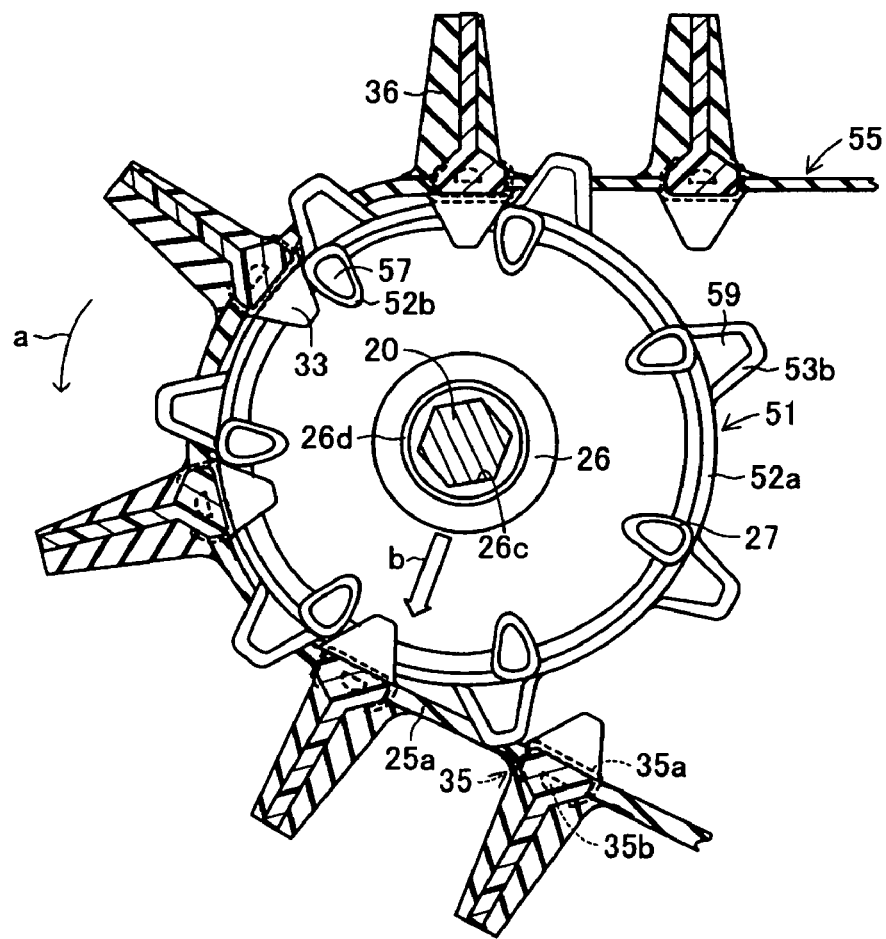
FIG. 16 shows a sectional view, taken along the section line 16-16 of FIG. 15.

FIGS. 15 and 16 show another embodiment of a snowmobile that includes a track belt 55 that is coupled with a sprocket 51. The sprocket 51 comprises a projection drive sprocket 51a and a window drive sprocket 51b that can be combined. A damper 52a can be formed on the circumferential surface of the projection drive sprocket 51a. In one embodiment the damper 52b includes a plurality of dampers of about a substantially cylindrical shape that can be formed on the circumferential surfaces of drive projections 57, which can be formed at or adjacent to the outer periphery and on both sides of the projection drive sprocket 51a.

A damper 53a can be formed on a peripheral surface of the window drive sprocket 51b. The damper 53b can be formed on a surface located at or adjacent to the outer periphery or edge of the drive projection 59 of the window drive sprocket 5lb. The dampers 52a, 52b, 53a, and 53b can be made of a rubber material and can be coupled to corresponding parts of the projection drive sprocket 51a and the window drive sprocket 51b, which can be made of a suitable material such as a super high polyethylene polymer, as discussed above, by any suitable technique, such as by integral molding.

The dampers 52a, 52b, 53a, and 53b comprise periphery dampers. Other parts of the sprocket 51, the track belt 55, etc. are the same in constitution as the sprocket 21 and the track belt 25 described above, and so the same parts are provided with the same reference numerals and symbols and their description are not repeated but rather are incorporated here by reference. Other parts of the snowmobile provided with this sprocket 51 are also the same as those discussed above.

In this embodiment, the impact at the time of engagement between the drive projection 57 and the driven projection 33 is at least partially absorbed with the damper 52b. Also, shocks and vibrations due to contact between the outside circumferential surface of the projection drive sprocket 51a and the first track 31 is absorbed with the damper 52a. Therefore, the projection drive sprocket 51a, the track belt 55, and the drive projection 57 are less likely to break or wear out prematurely. Further, the impact, e.g., vibration or shock, produced by the engagement between the drive projection 59 and the edge of the web portion 35 is at least partially absorbed with the damper 53b. Also, the impact due to contact between the peripheral surface of the window drive sprocket 51b and the flat part of the surface of the web portion 35 constituting the second track 32 is absorbed with the damper 53a, so that the window drive sprocket 51b and the track belt 55 are less likely to break, wear out prematurely or produce excessive noise. Accordingly, this arrangement can further reduce the noise produced by this snowmobile drive arrangement. Other functional effects of the snowmobile provided with the sprocket 51 are the same as those of the above-described snowmobile SM.

Figure 17:
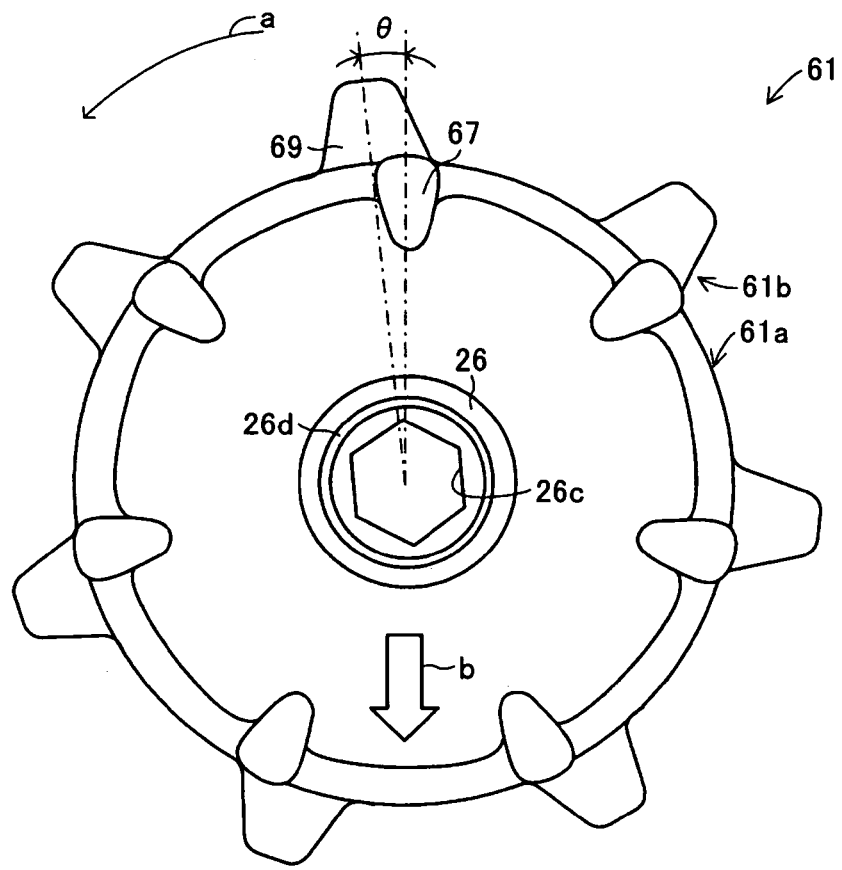
FIG. 17 is a front view of one embodiment of a sprocket.

FIG. 17 shows a sprocket 61 provided on another embodiment of a snowmobile. The sprocket 61 comprises a projection drive sprocket 61a and a window drive sprocket 61b. The projection drive sprocket 61a and the window drive sprocket 61b are combined together so that the rotational position of a central portion of the drive projection 69 is ahead of the rotational position of a central portion of the drive projection 67 by an angle of θ in the rotary direction (a). Other parts of the sprocket 61 are the same in constitution as those of the sprocket 21 shown in FIG. 8 and so the same parts are provided with the same reference numerals and symbols and their description is omitted here, but is incorporated here by reference. Other parts of the snowmobile provided with this sprocket 61 are also the same in constitution as those of the above described snowmobile SM.

In this embodiment, the time of contact between the drive projection 67 and the driven projection 33 is different from the time of contact or engagement between the drive projection 69 and the track belt portion 35. As a result, disadvantageous effects of this contact or engagement are relieved. Accordingly, the sprocket 61 and the track belt 25 are less likely to wear out or break prematurely. Other functional effects of the snowmobile provided with this sprocket 61 are the same as those of the above-described snowmobile SM.

This application is not limited to the above-described embodiments. Rather, the invention may be embodied with appropriate modifications. For example, while the surface of the track belt portion 35 in the above embodiments comprises the cover member 35a made of steel plate, the cover member 35a can be omitted, or the cover member may be made of any other material. However, the track belt portion and the cover member are preferably made of hard materials to provide durability and good sliding properties.

In one variation, the projection drive sprocket 41a is provided with the damper 42, and the window drive sprocket 41b is provided with the damper 43. In one variation, the projection drive sprocket 51a is provided with the dampers 52a and 52b, and the window drive sprocket 51b is provided with the dampers 53a and 53b. In another variation, these dampers are provided only on the projection drive sprocket 41a, 51a, or on the window drive sprocket 41b, 51b. The dampers can be provided on all or less than all of the sprocket subcomponents described above.

Also, it is possible to provide the drive projections 27 and 29 of the projection drive sprocket 41a and the window drive sprocket 41b are in the same circumferential position (rotational location), or to make the drive projections 57 and 59 of the projection drive sprocket 51a and the window drive sprocket 51b are in the same circumferential position (rotational location). Also, it is possible to reduce or minimize noise from being produced by engagement of drive and driven portions by providing the dampers, and to prevent the sprockets 41 and 51, and the track belts 45 and 55 from wearing out or breaking prematurely. Further, while the sprocket 21 or the like is made up of projection drive sprocket 21a or the like and the window drive sprocket 21b or the like as separate members, they may be made as an integral member. Moreover, constitution of other parts of the snowmobile according to the present invention may be appropriately modified within the technical scope of the present invention.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. For example, one or more of the above described embodiments and aspects could be applied in or deployed with a track drive vehicle, such as a land vehicle that is driven by or can be configured to be driven by a track or an endless track belt. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A snowmobile, comprising:
    an engine configured to rotate a drive shaft;
    a track belt comprising an inner surface having a first track portion with a plurality of driven projections at regular intervals along a direction of movement of the track belt, and a second track portion with a plurality of driven windows at regular intervals along the direction of movement of the track belt;
    a slide rail configured to apply pressure to the inner surface of the track belt to press the track belt against a riding surface;
    a drive mechanism comprising:
    a first drive sprocket portion having a projection drive portion including one or more members for engaging the driven projections, the first drive sprocket portion being coupled with the drive shaft; and
    a second drive sprocket portion having a window drive portion for engaging an edge of the driven windows, the second drive sprocket portion being coupled with the drive shaft;
    wherein the driven projections, the driven windows, the projection drive portion, and the window drive portion are positioned so that the time when the driven projections and the projection drive portion initially engage each other is different from the time when the edge of the driven window and the window drive portion initially engage each other.

2. The snowmobile of claim 1, wherein at least one of the pluralities of driven projections and driven windows comprises projections or windows formed at constant intervals.

3. The snowmobile of claim 1, wherein for adjacent projection drive portions and window drive portions, the projection drive portion contacts the driven projection before the window drive portion contacts the edge of the driven window.

4. The snowmobile of claim 3, further comprising a hub through which the drive mechanism is coupled to the drive shaft and a hub damper and extending along the drive shaft within the hub, the hub comprising an inner circumferential portion and an outer circumferential portion, wherein the hub damper is located between the inner circumferential portion and the outer circumferential portion of the hub.

5. The snowmobile of claim 3, wherein at least a portion of at least one peripheral surface of the drive mechanism, the projection drive portion, and the window drive portion are comprise a periphery damper.

6. The snowmobile of claim 1, further comprising a hub through which the drive mechanism is coupled to the drive shaft and a hub damper and extending along the drive shaft within the hub, the hub comprising an inner circumferential portion and an outer circumferential portion, wherein the hub damper is located between the inner circumferential portion and the outer circumferential portion of the hub.

7. The snowmobile of claim 1, wherein at least a portion of at least one peripheral surface of the drive mechanism, the projection drive portion, and the window drive portion are comprise a periphery damper.

8. The snowmobile of claim 1, wherein the first drive sprocket portion and the second drive sprocket portion are configured to be mounted separately on the drive shaft.

9. The snowmobile of claim 1, wherein the drive mechanism is made as a unitary member by integral molding.

10. The snowmobile of claim 1, wherein the drive mechanism is a first drive mechanism located on a first lateral side of the snowmobile and further comprising a second drive mechanism located on a second lateral side of the snowmobile.

11. The snowmobile of claim 1, wherein the second drive mechanism comprises:
    a third drive sprocket portion having one or more members for engaging the track belt, the third drive sprocket portion being coupled with the drive shaft; and
    a fourth drive sprocket portion configured to engage the track belt, the fourth drive sprocket portion being coupled with the drive shaft.

12. A snowmobile, comprising:
    an engine configured to rotate a drive shaft and a hub supported by the drive shaft;
    a track belt configured to be driven upon rotation of the drive shaft, the track belt having an inner surface comprising a first track portion having a plurality of driven projections at substantially constant intervals along the direction of movement of the track belt, and a second track portion having a plurality of driven windows at substantially constant intervals along the direction of movement of the track belt;
    a slide rail configured to be positioned over the second track to press the track belt into a ground surface;
    a drive device comprising a projection drive sprocket having a projection drive portion configured to engage the driven projection and a window drive sprocket having a window drive portion configured to engage an edge of the driven window, the drive device being coupled with the drive shaft through the hub;
    a hub damper disposed around the drive shaft and located between an inner circumferential portion of the hub and an outer circumferential portion of the hub;

wherein a support member is disposed within the hub between the drive shaft and the hub damper, the support member comprising a first support member and a second support member, the first support member providing support for the projection drive sprocket and the second support member providing support for the window drive sprocket.

13. The snowmobile of claim 12, wherein the projection drive sprocket and the window drive sprocket are configured to be mounted separately on the drive shaft.

14. The snowmobile of claim 12, wherein the drive device is made as a unitary member by integral molding.

15. The snowmobile of claim 12, wherein the drive device comprises a first drive device coupled with a first lateral side of the drive shaft and further comprising a second drive device coupled with a second lateral side of the drive shaft.

16. The snowmobile of claim 12, wherein the support member comprises a reinforcing material different than the hub.

17. The snowmobile of claim 12, wherein the support member is embedded within the hub such that a portion of the hub is located between the support member and the drive shaft and a portion of the hub is located between the support member and the hub damper.

* * * * *

UNITED STATES PATENT AND TRADEMARK OFFICE
CERTIFICATE OF CORRECTION

| | | |
|---|---|---|
| PATENT NO. | : 7,597,167 B2 | Page 1 of 1 |
| APPLICATION NO. | : 11/345734 | |
| DATED | : October 6, 2009 | |
| INVENTOR(S) | : Kubota | |

It is certified that error appears in the above-identified patent and that said Letters Patent is hereby corrected as shown below:

Title page, item (*) Notice: Subject to any disclaimer, the term of this patent is extended or adjusted under 35 U.S.C. 154(b) by 396 days.

Delete "396 days" and insert --642 days--.

In column 6 at line 28, Change "invention" to --invention,--.

In column 8 at line 33, Change "21 a" to --21a--.

In column 9 at line 7, Change "3-1" to --31--.

In column 11 at line 50, Change "5lb." to --51b.--.

Signed and Sealed this

Twenty-seventh Day of July, 2010

David J. Kappos
*Director of the United States Patent and Trademark Office*